US012569992B2

(12) United States Patent
Ponton Junes et al.

(10) Patent No.: US 12,569,992 B2
(45) Date of Patent: Mar. 10, 2026

(54) AUTOMATIC DETERMINATION OF ROBOT SETTLING STATES

(71) Applicant: Intrinsic Innovation LLC, Mountain View, CA (US)

(72) Inventors: Brahayam David Ponton Junes, Munich (DE); Markus Gifthaler, Freising (DE)

(73) Assignee: Intrinsic Innovation LLC, Mountain View, CA (US)

( * ) Notice: Subject to any disclaimer, the term of this patent is extended or adjusted under 35 U.S.C. 154(b) by 181 days.

(21) Appl. No.: 18/612,719

(22) Filed: Mar. 21, 2024

(65) Prior Publication Data

US 2025/0296230 A1      Sep. 25, 2025

(51) Int. Cl.
*B25J 9/00* (2006.01)
*B25J 9/16* (2006.01)
(52) U.S. Cl.
CPC ................................... *B25J 9/1638* (2013.01)
(58) Field of Classification Search
CPC ...................................................... B25J 9/1638
See application file for complete search history.

(56) References Cited

U.S. PATENT DOCUMENTS

| | | | |
|---|---|---|---|
| 10,946,519 B1 * | 3/2021 | Prats ...................... | G05B 15/00 |
| 2021/0339390 A1 * | 11/2021 | Gaschler ............... | B25J 9/1664 |
| 2023/0166400 A1 * | 6/2023 | Zeng ....................... | B25J 9/163 |
| | | | 700/254 |
| 2023/0302636 A1 * | 9/2023 | Wang ..................... | B25J 9/1664 |

FOREIGN PATENT DOCUMENTS

| | | | | | |
|---|---|---|---|---|---|
| JP | 2011088225 A | * | 5/2011 | ............ | B25J 9/1641 |
| JP | 2023542515 A | * | 10/2023 | ............ | B25J 9/0093 |

OTHER PUBLICATIONS

Wikipedia.org [online], "Settling time," last edited Jun. 27, 2024, retrieved on Apr. 14, 2025, retrieved from URL <https://en.wikipedia.org/wiki/Settling_time>, 2 pages.

* cited by examiner

*Primary Examiner* — Truc M Do
*Assistant Examiner* — Shaheda Shabnam Hoque
(74) *Attorney, Agent, or Firm* — Fish & Richardson P.C.

(57)      ABSTRACT

Methods, systems, and apparatus, including computer programs encoded on computer storage media, for controlling a robot based on settling time of the robot. One of the methods includes executing, by a robot having one or more joints, a motion trajectory to move from a first pose to a second pose; repeatedly computing a settled state confidence score after the robot has begun execution of the motion trajectory; and whenever the current settled state confidence score satisfies a threshold value, executing, by the robot, a command that causes the robot to move.

20 Claims, 6 Drawing Sheets

300

Execute, by a robot, a motion trajectory
*310*

Determine, for each of one or more joints of the robot, a current velocity value
*320*

Determine, for each of the one or more joints of the robot, a velocity difference
*330*

Obtain an indicator value
*340*

Compute a current value of the confidence score
*350*

Whenever the confidence score satisfies a threshold value, execute, by the robot, a command
*360*

AUTOMATIC DETERMINATION OF ROBOT SETTLING STATES

BACKGROUND

This specification relates to robotics, and more particularly to planning robotic movements.

Robotics control refers to scheduling the physical movements of robots in order to perform tasks. For example, an industrial robot that builds cars can be programmed to first pick up a car part and then weld the car part onto the frame of the car. Programming a robot to perform these actions can require planning and scheduling dozens or hundreds of individual movements by robot motors and actuators.

To ensure successful task performance by the robot, at least some physical movements of robots need to be scheduled in a way that accounts for robot settling time, i.e., that accounts for an extent of time needed for the robot to enter a settled state. For example, robot settling time may be estimated by manual tuning based on the dynamic and/or noise properties that are specific to a particular robot. However, such methods are hard to scale, tedious, and time-consuming. Moreover, manually tuning a large number of robots is slow and consumes a significant amount of power. As another example, robot settling time may be estimated based on an elapsed time period since the latest command issued to the robot that caused the robot to move. For example, the length of the elapsed time period may be empirically determined based on historical performance of the robot, on performance of other robots of the same model, and so on. Estimating robot settling time using this method could easily make false positive errors when a robot has a longer than normal settling time following certain movements.

SUMMARY

This specification describes a system implemented as computer programs on one or more computers in one or more locations that controls a robot to perform one or more tasks by generating and providing commands to the robot and receiving status data from the robot. The system can determine whether the robot is in a settled state and, correspondingly, provide a next command when the robot is in the settled state. That is, the system controls the robot by providing at least some commands to the robot for execution only when the robot is in the settled state. The system is thus capable of controlling a robot to perform a number of tasks, e.g., tasks that involve manipulating deformable objects or capturing high accuracy sensor measurements, that have high precision requirements, where a slight error in robot movement potentially caused by vibration during the settling time can result in failure of the task.

Particular embodiments of the subject matter described in this specification can be implemented so as to realize one or more of the following advantages.

This specification describes techniques for adaptively and more accurately determining the settling time of the robot by computing a settled state confidence score based on real-time status data reported by the robot. Accurate determination of the settling time can ensure that new commands for controlling the robot are issued and, thereafter, executed only when the robot is in a settled state to improve the responsiveness of the robot and minimize the impact of actuator noise on the overall performance of the robot. Using described techniques thus provides additional capabilities for the robot to act in a more natural and fluid way, which results in higher precision movements, shorter cycle times, and more reliability when completing tasks.

The described techniques are hardware agnostic, and are applicable across different robot models that have different hardware properties. This is a vast improvement over some existing settling time estimation methods that require at least some amount of manual tuning based on the dynamic and/or noise properties that are specific to a particular robot, as well as over some existing settling time estimation methods that rely on an elapsed time period since the latest command as the major factor contributing to the unsettledness of the robot. The prior methods are hard to scale, tedious, and time-consuming, while the latter methods could easily make false positive errors when a robot has a longer than normal settling time.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
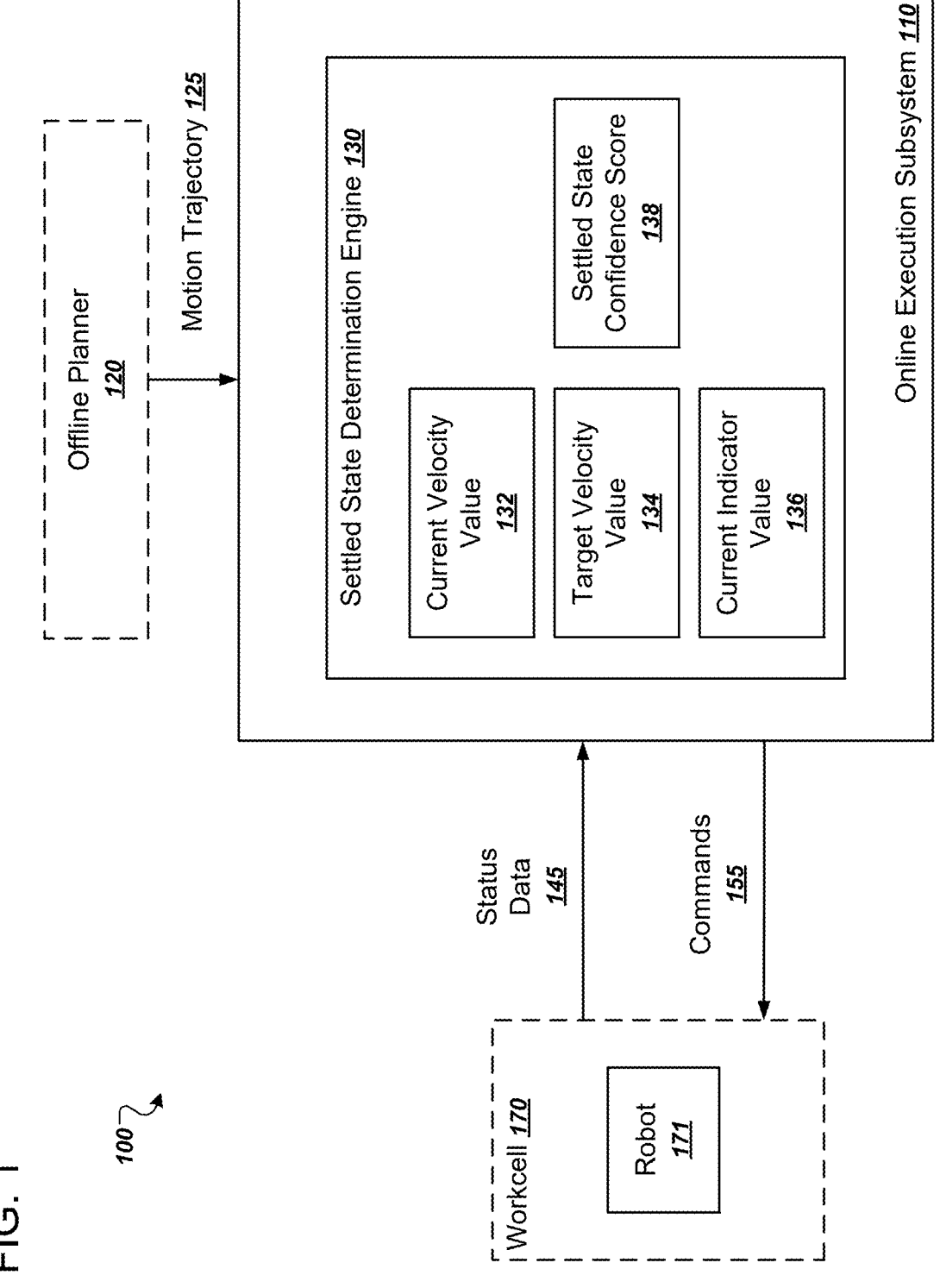
FIG. 1 is a diagram that illustrates an example system.

FIG. 1 is a diagram that illustrates an example system 100. The system 100 is an example of a system that can implement the robot control techniques described in this specification. In particular, the system 100 can control a robot based on the settling time of the robot.

The settling time of a robot may refer to an extent of time needed for one or more movable components (e.g., one or more joints and/or links) of the robot to come to a stop (e.g., a full stop or a near-complete stop). A settled state of the robot can be a state where a velocity value of a joint of the robot is within an error band around a predetermined velocity value, e.g., around a zero value or another value that is near zero.

Figure 2:
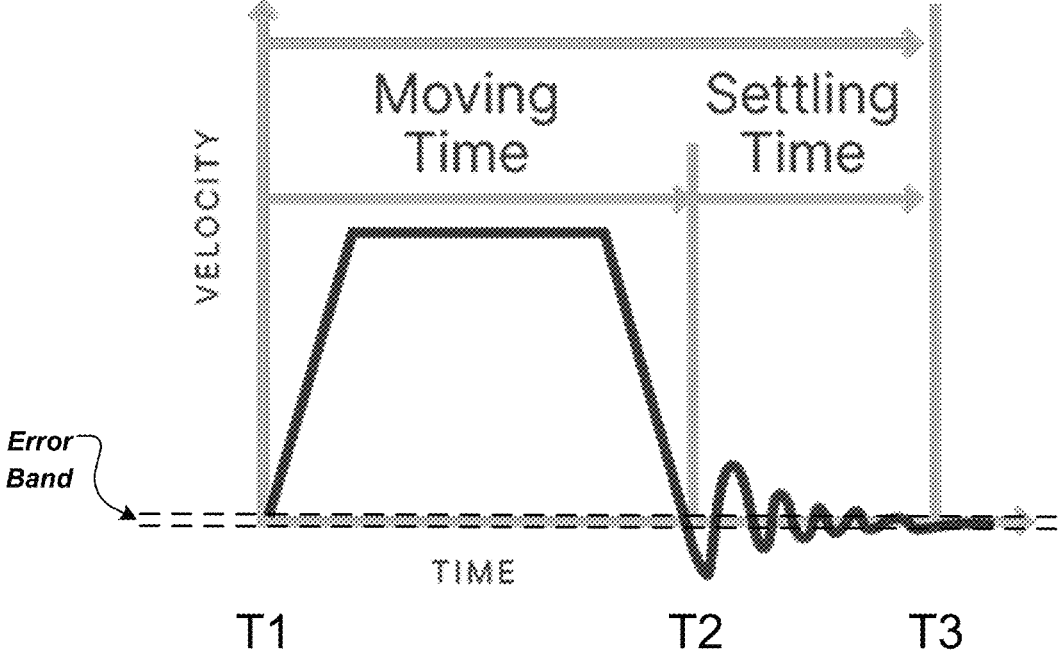
FIG. 2 is an example illustration of settling time.

Turing briefly to FIG. 2, which is an example illustration of settling time of a robot. As shown in FIG. 2, the robot begins a movement at T1, stops the movement at T2, and enters a settling state at T3. The moving time (T2–T1) for the robot is time period during which a joint of the robot moves at a velocity value that is greater than zero, and the settling time (T3–T2) for the robot is the time period required for a velocity value of the joint of the robot to reach and remain within an error band (or a threshold range) around a zero velocity value.

The system 100 includes a number of functional components, including an online execution subsystem 110 which, in turn, includes a settled state determination engine 130. Each of these components can be implemented as computer programs installed on one or more computers in one or more locations that are coupled to each other through any appropriate communications network, e.g., an intranet or the Internet, or combination of networks.

In operation, the online execution subsystem 110 provides commands 155 to be executed by one or more robots, e.g., robot 171, in a workcell 170 to perform one or more tasks. The robot 171 can be any robot that includes an arm, an end effector at the end of the arm, and a base. The arm includes one or more joints and one or more links. The end effector can be a tool, e.g., a welding device, spray gun, or a gripper, to name just a few examples.

In this specification, a task is an operation to be performed by an end effector. For brevity, when a robot has only one end effector, a task can be described as an operation to be performed by the robot as a whole. Example tasks include welding, glue dispensing, part positioning, and surfacing sanding, to name just a few examples.

In particular, the online execution subsystem 110 can obtain trajectory data that represents a motion trajectory 125 and issue commands 155 to robot 171 in the workcell 170 in order to actually drive the movements of the moveable components, e.g., the joints, of the robot 171, so that the robot 171 can follow the motion trajectory 125.

The motion trajectory 125 can be obtained in many ways. In some implementations, the online execution subsystem 110 receives, e.g., from a system administrator or another computer system, a definition of one or more tasks to be performed, and generates the motion trajectory 125 from the received definition. In other implementations, the online execution subsystem 110 receives the motion trajectory 125 from an offline planner 120, which is an optional component of the system 100.

The overall goal of the offline planner 120 is to generate motion trajectories that will be executed by the robot 171 to accomplish the one or more tasks. The offline planning process is typically computationally expensive. Thus, in some implementations, the offline planner 120 is implemented by a cloud-based computing system comprising many, possibly thousands, of computers. The offline planner 120 is thus commonly physically remote from a facility that houses the workcell 170. On the other hand, the online execute subsystem 110 is typically local to the facility that houses the workcell 170.

The motion trajectory 125 includes at least a movement to be performed by the robot 171 between a start point and an end point. The start point and end point can be represented by poses, locations in a coordinate system, or tasks to be performed. For example, the motion trajectory 125 can be a joint trajectory between a start pose and an end pose for the robot 171 in the workcell 170 to follow. As another example, the motion trajectory 125 can be an end effector trajectory between a start position and an end position for the robot 171 in the workcell 170 to follow.

In this specification, a "joint trajectory" refers to a sequence of joint configurations (e.g., joint angles) of the joints of the robot 171 in a joint coordinate frame. An "end effector trajectory," by contrast, refers to a trajectory of the end effector of the robot 171 in a Cartesian coordinate frame.

In these examples and other examples, the online execution subsystem 110 can use a kinematic model that is specific to the robot 171 to map desired positions, poses, or both in one coordinate system, e.g., Cartesian coordinates or joint angles, into commands 155 for physically moving the one or more joints of the robot to their desired positions or poses. For example, the online execution subsystem 110 can generate a sequence of commands 155 for a given joint of the robot 171 across multiple time points within a time period, where each command 155 implicitly or explicitly defines a desired configuration of the given joint at a corresponding time point.

In execution, the robot 171 continually executes the commands 155 issued by the online execution subsystem 110 based on the motion trajectory 125 to perform the one or more tasks. In some implementations, the online execution subsystem 110 provides the commands 155 at varying rate, or a rate that is sporadic, or both, and the robot 171 will execute the commands 155 once they are received.

In other implementations, the robot 171 can expect a command from the online execution subsystem 110 at a fixed rate, e.g., every 5, 10, or 20 milliseconds. For example, such a rate may depend on an operating frequency of the robot 171. However, depending on the configuration of the robot 171, even if the robot does not receive a command that is expected, it does not necessarily enter a fault mode or stop operating.

During execution the robot 171 can report status data 145 back to the online execution subsystem 110, and the online execution subsystem 110 can consume the status data 145 to compute new commands. In some implementations, the robot 171 can provide status data 145 to the online execution subsystem 110 at a fixed rate, e.g., every 5, 10, or 20 milliseconds, which may for example depend on the operating frequency of the robot 171.

The status data 145 can include any digital information that characterizes or otherwise specifies a current status or operating condition of the robot 171. For example, the status data 145 can specify the make/model/configuration/health of the robot 171. As another example, the status data 145 can include robot runtime statistics or feedbacks. For example, the status data 145 can specify, for each he of the one or more joints of the robot, one or more of: a position, a velocity, an acceleration, a torque of the joint.

The settled state determination engine 130 included in the online execution subsystem 110 can use the status data 145 to determine whether the robot 171 is in a settled state. Optionally, in some implementations, the online execution subsystem 110 can also use the status data 145 to make online adjustments to the robot movements, e.g., due to local faults or other unanticipated conditions.

Many tasks require very precise and rapid movement of the robot 171 within the workcell 170. However, it is difficult to improve the precision of movement, such as linear movement, of robot 171 during settling time.

As mentioned above, the settling time may refer to an extent of time needed for one or more movable components (e.g., one or more joints and/or links) of the robot 171 to come to a stop (e.g., a full stop or a near-complete stop), e.g., after the robot 171 has completed the traversal of the motion trajectory 125, or after the online execution subsystem 110 issues a command 155 to stop movement of these movable components.

Robot performance may become affected during the settling time, including corrupted responsiveness, increased actuator noise, and increased sensor noise. Furthermore, vibration of the end effector that is attached to the end of the robot arm may not be suppressed. To ensure a high degree of precision and reliability, in some cases, there is a need for a waiting time after the robot 171 has completed the traversal of the motion trajectory 125 before starting another operation, e.g., before it begins to follow another motion trajectory or perform an action using the end effector.

As one example for illustration, the task is a robot sensor calibration task, e.g., a robot camera calibration task, which involves the robot 171 moving to multiple calibration poses within the workcell 170 and capturing sensor measurements while the robot is at each of the multiple calibration poses. If sensor measurements are captured while the robot is unsettled, calibration accuracy, and thus, robot performance on future tasks may be impacted. Accordingly, sensor measurements are ideally captured only when the robot is in the settled state to facilitate an effective calibration process.

As another example for illustration, when the workcell 170 is arranged on factory floors and in other manufacturing spaces, the tasks may include tasks for manufacturing a product. To perform these tasks, the robot 171 is typically required to transport objects, e.g., materials or products, between various locations. For example, the robot 171 can transport the objects resting upon the end effector at the end of the arm to and from various processing units. When the arms are long, rigidity of the robot mechanism may be a concern in that rapid starts and stops of joints of the robot 171 may cause vibration of the end effector. Accordingly, placement of the objects may require waiting until the vibrations settle.

To that end, the online execution subsystem 110 uses the settled state determination engine 130 to repeatedly, e.g., at each of multiple time points across a time period that spans at least the time period during which the robot 171 is in operation to traverse the motion trajectory 125, compute a settled state confidence score 138 that represents a level of confidence that the robot 171 has entered a settled state. In this specification, the settled state is a state of the robot 171 in which a velocity value of a joint of the robot is within an error band around a predetermined velocity value, e.g., around a zero value or another value that is near zero.

At each time point during the time period, the online execution subsystem 110 determines, based on the settled state confidence score 138, whether to provide a command 155 for another operation to the robot 171. The command 155 for another operation can generally be a high-level command, e.g., a command for following another trajectory, or moving the end-effector to a given pose, and so on. Such high-level commands are different from the low-level commands, e.g., joint torque commands that set the joint torques of the robot 171 for the next control cycle (which may be provided at a fixed rate as mentioned above).

In some implementations, the online execution subsystem 110 does this by repeatedly comparing the settled state confidence score 138 to a predetermined threshold value, and only providing a command 155 to the robot 171 until after the settled state confidence score 138 satisfies, e.g., is greater or less than, the predetermined threshold value.

In particular, the settled state determination engine 130 uses a variety of data values to compute the settled state confidence score 138. The data values include a current velocity value 132 for each of the one or more joints of the robot 171. For example, the current velocity values can be received by the settled state determination engine 130 as a part of the status data 145 reported by the robot 171.

The data values also include, for each of the one or more joints of the robot 171, a velocity difference between the current velocity value and a target velocity value. For example, the target velocity value for each joint can be explicitly defined in the trajectory data representing motion trajectory 125. As another example, the target velocity value for each joint can be computed by the settled state determination engine 130 (or another component of the online execution subsystem 110) based on the available information included the trajectory data, e.g., the desired poses or locations along the motion trajectory 125; on the configuration of the robot 171, e.g., the lengths of the links or the types of the joints; or both, and possibly other information that is specific to the workcell 170.

In some implementations, the data values further include an indicator value that indicates whether the robot 171 has completed the traversal of the motion trajectory 125. For example, the indicator value can be a binary value that is set to zero when the robot 171 is still traveling along the motion trajectory 125 and has not yet arrived at the end point of the motion trajectory, and is set to one when the robot 171 has arrived at the end point of the motion trajectory, or vice versa. As another example, the indicator value can take any value between a continuous range, e.g., between zero and one, inclusive on both ends, where zero indicates the completion of the traversal of the motion trajectory 125 and one indicates the traversal of the motion trajectory 125 is not yet complete, or vice versa.

Computing the settled state confidence score 138 using these data values will be explained further below.

Figure 3:
FIG. 3 is a flowchart of an example process for controlling a robot.
Figure 3:
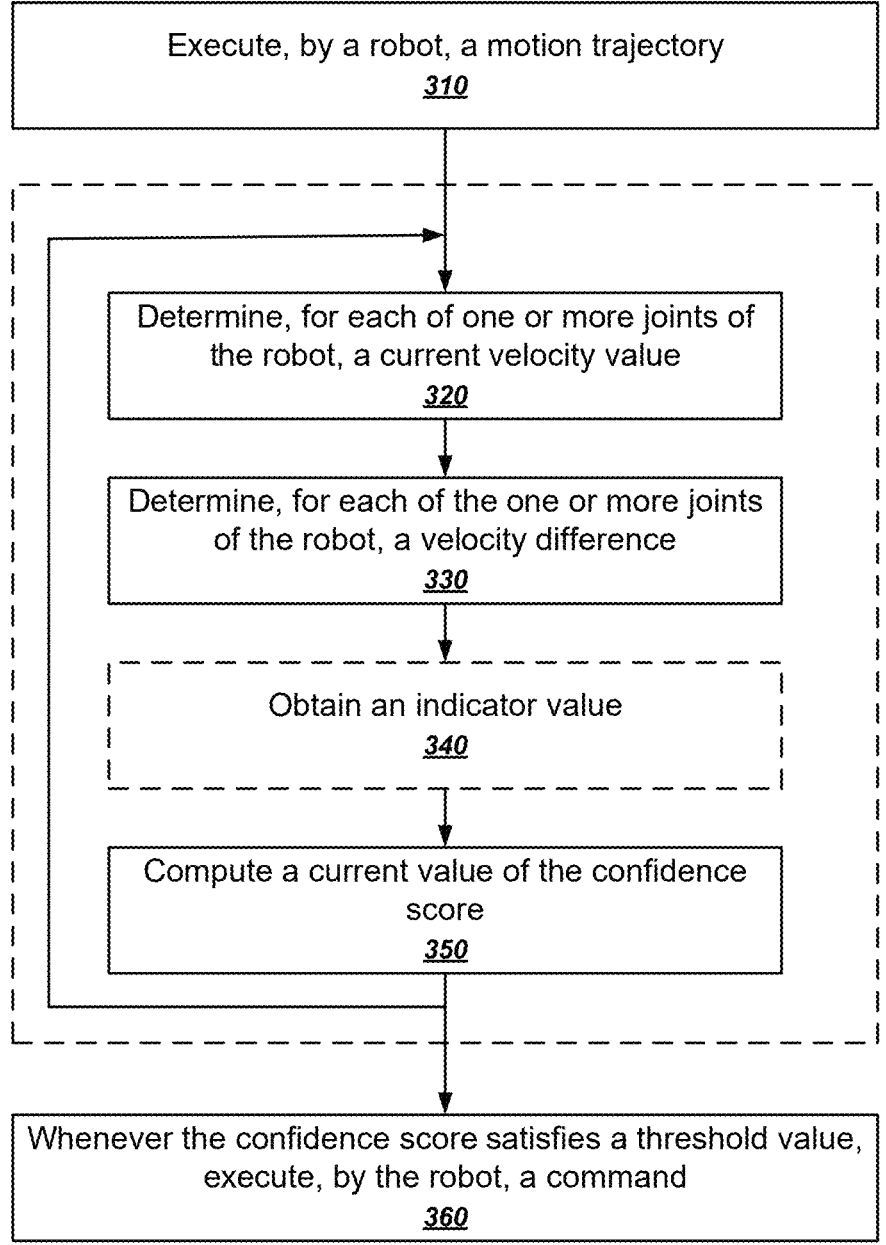

FIG. 3 is a flowchart of an example process 300 for controlling a robot. The example process can be performed by a system of one or more computers appropriately programmed in accordance with this specification. For example, the example process 300 can be performed by a system, e.g., the system 100 of FIG. 1. For convenience, the example process 300 will be described as being performed by a system of one or more computers.

The system executes, by a robot having one or more joints, a motion trajectory to move from a start point to an end point, e.g., from a first pose to a second pose, or from a first position to a second position (step 310). To that end, the system generates and provides one or more commands to be executed by the robot to follow the motion trajectory.

After the robot has begun execution of the motion trajectory, the system repeatedly performs the following steps 320-350 (where step 340 is optional) to repeatedly compute a settled state confidence score. The settled state confidence score represents a level of confidence that the robot has entered a settled state.

Thus, each iteration of steps 320-350 (where step 340 is optional) can be performed concurrently with step 310, or shortly after the completion of step 310. For example, each iteration of steps 320-350 (where step 340 is optional) can be performed at each of multiple time points across a time period that spans at least a time period during which the robot is in operation to traverse the motion trajectory. In this example, the multiple time points can be separated from each other by a fixed time interval that is dependent on an operating frequency of the robot, e.g., dependent on a rate at which the robot receives commands or a rate at which the robot reports status data.

The system determines, for each of the one or more joints of the robot, a current velocity value (step 320). For example, the current velocity values can be included in the status data reported by the robot while it is in operation.

The system determines, for each of the one or more joints of the robot, a velocity difference between (i) the current velocity value determined at step 320 and (ii) a target velocity value specified by the motion trajectory (step 330). For example, the target velocity value for each joint can be explicitly defined in the trajectory data representing motion trajectory. As another example, the target velocity value for each joint can be computed based on the available information included in the trajectory data, the configuration of the robot, or both, and possibly other information specific to a workcell that includes the robot.

In some implementations, the system obtains an indicator value that indicates whether the execution of the motion trajectory by the robot is complete (step 340). For example, the indicator value can be a binary value that is set to zero when the robot is still traveling along the motion trajectory and has not yet arrived at the end point of the motion trajectory, and is set to one when the robot has arrived at the end point of the motion trajectory, or vice versa. As another example, the indicator value can take any value between a continuous range, e.g., between zero and one, inclusive on both ends, where zero indicates the completion of the traversal of the motion trajectory and one indicates the traversal of the motion trajectory is not yet complete, or vice versa.

The system computes, based on the current velocity values, the velocity differences, and, in some cases, the indicator value, a current settled state confidence score for the time point (step 350). In some implementations, the system can do this by initializing the confidence score, i.e., generating an initial settled state confidence score, at the beginning of the time period, and then, at each subsequent time point, using the data values obtained at the time point to repeatedly update a previous settled state confidence score that has been computed at a previous time point.

As a particular example of this, the system can compute a variance $\sigma^2$ of the velocity difference for each of the one or more joints of the robot over the multiple time points, up to (and including) the current time point, and then uses the variance $\sigma^2$, the current velocity values, and, optionally, the indicator value to determine the update to the previous settled state confidence score.

In this example, the system can determine the update by evaluating the following equation:

$$\frac{dC}{dt} = \text{IncreaseRate}(\sigma^2) - \text{DecreaseRate}(\sigma^2) \, \text{Modulation}\left(\frac{dq}{dt}, I_{traj}\right) C$$

where C represents the (previous) settled state confidence score and dC/dt represents the update to the (previous) settled state confidence score, $\sigma^2$ represents the variance of the velocity difference for each of the one or more joints of the robot over the multiple time points, up to (and including) the current time point, dq/dt represents the current velocity value for each of the one or more joints of the robot, and $I_{traj}$ represent the indicator value that indicates whether the execution of the motion trajectory by the robot is complete.

IncreaseRate($\sigma^2$) is an affine function of the variance $\sigma^2$ for each particular task and/or each particular robot as new data becomes available.

DecreaseRate($\sigma^2$) is a mapping function that maps the variance $\sigma^2$ to a constant value. The mapping function can be learned from data collected offline from a number of robots. The mapping function may be, but need not be, implemented as a machine learning model.

Modulation $$\left(\frac{dq}{dt}, I_{traj}\right)$$

is a scaling function that scales the output of the DecreaseRate($\sigma^2$) function according to the current velocity value and the indicator value (it becomes Modulation (dq/dt) in implementations where the indicator value is not used). The scaling function can output a scaling factor that is in the range between 0.0 and 1.0. In some cases, when the robot is still moving (and thus the current joint velocities are different from zero) or the traversal of the motion trajectory is not yet complete, then its value is close to 0.0.

After determining such an update, the system applies the update to the previous settled state confidence score that has been computed at the previous time point, e.g., by adding the update, which is optionally multiplied with a factor dependent on a predetermined time length of a control cycle of the robot, to the previous settled state confidence score, to generate the current settled state confidence score.

The system compares the current settled state confidence score to a predetermined threshold value. If the current settled state confidence score does not satisfy the threshold value, then the process 300 returns to step 320, i.e., the system performs another iteration of steps 320-350 to compute a new settled state confidence score.

Alternatively, whenever the current settled state confidence score satisfies the threshold value, the system executes, by the robot, a command (step 360). In some cases where higher confidence scores represent a higher level of confidence that the robot has entered a settled state, the system can determine that the current settled state confidence score satisfies the threshold value when it is greater than the threshold value. In other cases where lower confidence scores represent a higher level of confidence that the robot has entered a settled state, the system can determine that the current settled state confidence score satisfies the threshold value when it is less than the threshold value.

The command can be a high-level command for another operation to be performed by the robot after the completion of the traversal of the motion trajectory, i.e., after the robot has arrived at the end point, e.g., arrived at the second pose or the second position. For example, the system can provide a high-level command that can be executed by the robot to perform an action by an end effector of the robot. As another example, the system can provide a high-level command that can be executed by the robot to execute another motion trajectory, e.g., to move from the second pose (or the second position) to a third pose (or the third position).

Figure 4A:
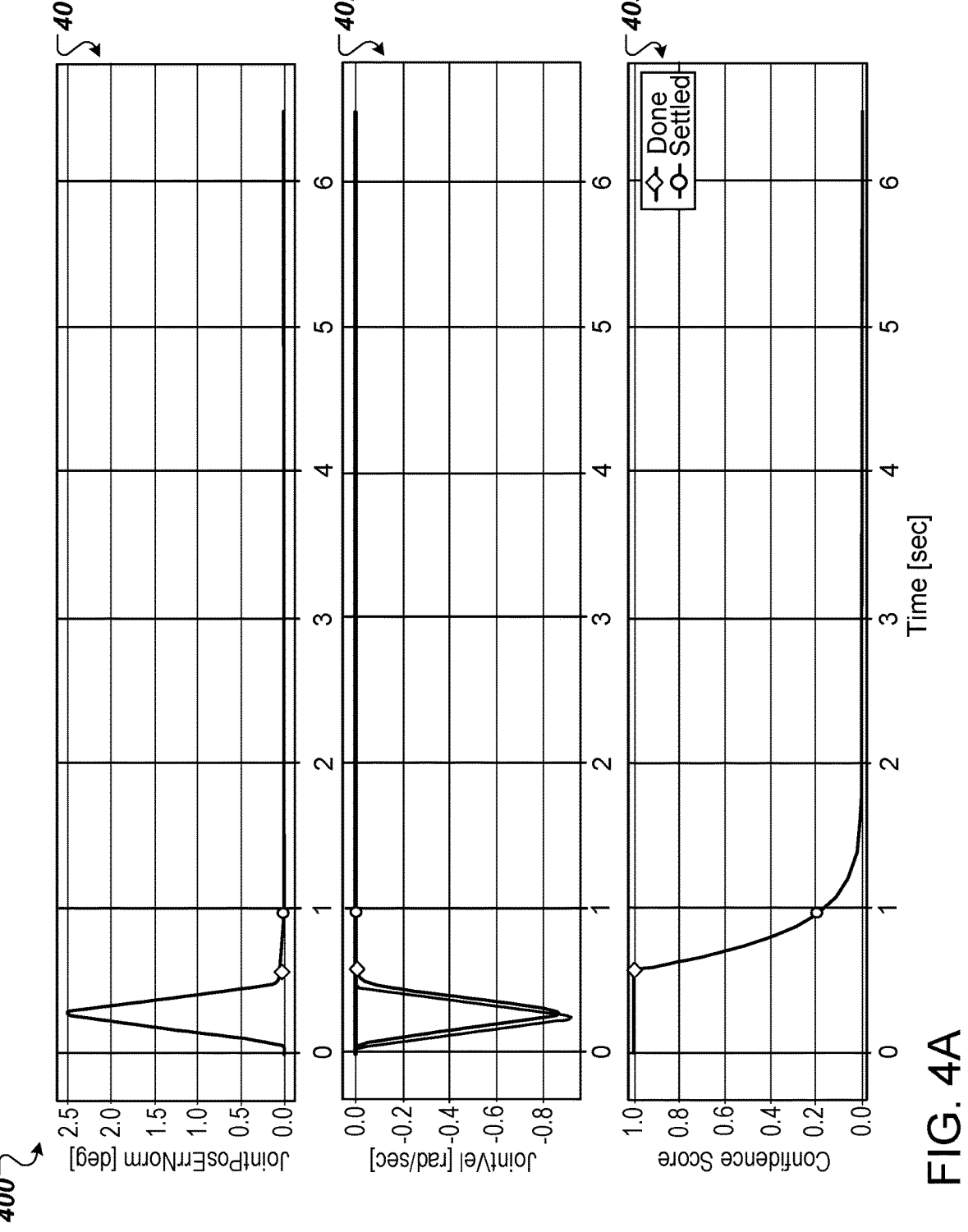
FIG. 4A is an example plot of changes in a settled state confidence score over time.

FIG. 4A is an example plot 400 of changes in a settled state confidence score over time. Specifically, plot 400 depicts a norm of position difference for a joint of a robot (a difference between a current position and a target position) at plot 401, current velocity value for the joint of the robot at plot 402, and current settled state confidence score at plot 403. All plots 401, 402, and 403 are shown over time (in seconds) along the x-axis.

It will be appreciated that, when the traversal of a motion trajectory is complete (indicated by the rhombus symbols) at around 0.6 s, the robot is not yet in a settled state, since its joint still has non-zero velocity values as shown in plot 402. The robot is determined to be in the settled state (indicated by the circle symbols) about 0.4 s later it has completed the traversal of the motion trajectory. In the example of FIG. 4A, lower confidence scores represent a higher level of confidence that the robot has entered a settled state. Thus, as depicted in plot 402, the confidence score is lower at 1.0 s than at 0.6 s.

Figure 4B:
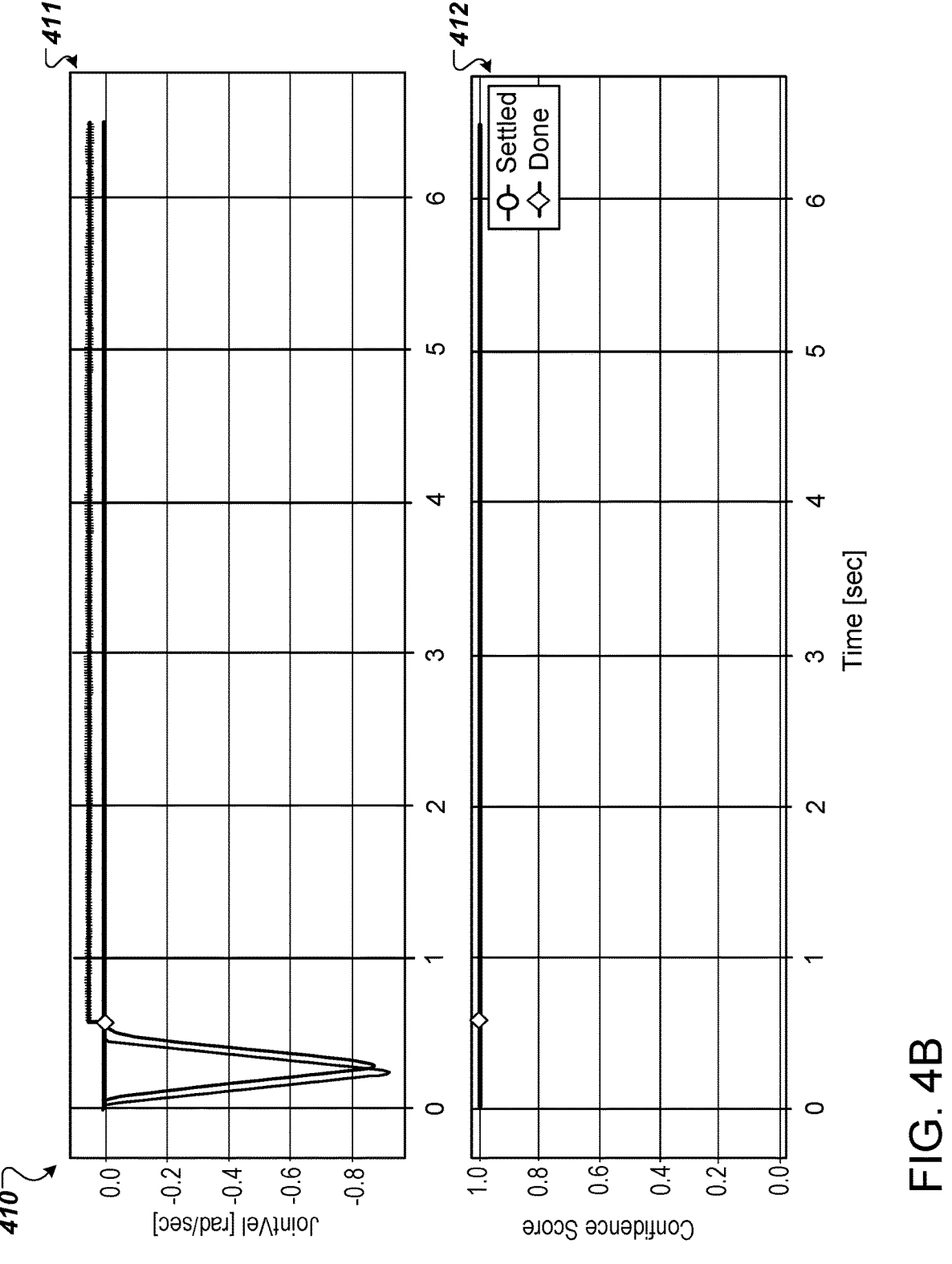
FIG. 4B is an example plot of changes in another settled state confidence score over time.

FIG. 4B is an example plot 410 of changes in another settled state confidence score over time. Specifically, plot 410 depicts current velocity value for a joint of a robot at plot 411 and current settled state confidence score at plot 412. Both plots 411 and 412 are shown over time (in seconds) along the x-axis.

In this example, although the traversal of a motion trajectory is complete (indicated by the rhombus symbols) at around 0.6 s, the robot is never determined to be in a settled state. In the example of FIG. 4B, lower confidence scores represent a higher level of confidence that the robot has entered a settled state. Thus, as depicted in plot 412, the confidence score remains around 1.0. This makes sense, because as shown in plot 411, the joint of the robot has a greater than zero velocity value throughout the entire time period depicted in plot 411.

This is in contrast to some existing settling time estimation methods that rely on a lapsed time period since the latest command, e.g., the latest low-level command (e.g., a joint torque command), as the major factor contributing to the unsettledness of the robot. For example, those methods may falsely determine that the robot has entered the settled state after 1 second or 2 seconds has passed since the completion of the traversal of the motion trajectory, namely at 1.6 s or 2.6 s, even when the joint velocity value has not converged to zero.

Figure 4C:
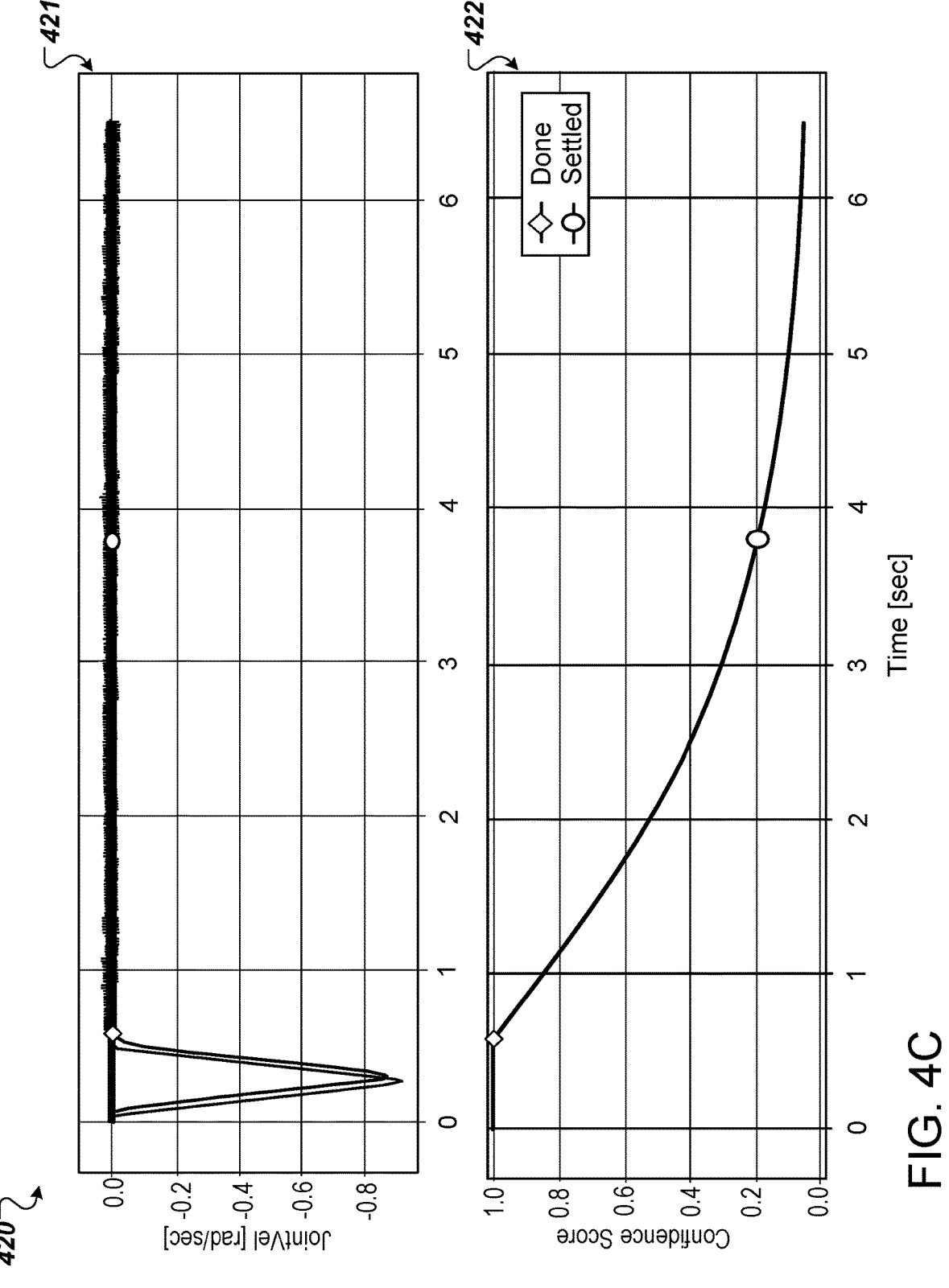
FIG. 4C is an example plot of changes in another settled state confidence score over time.

FIG. 4C is an example plot 420 of changes in another settled state confidence score over time. Specifically, plot 420 depicts current velocity value for a joint of a robot at plot 421 and current settled state confidence score at plot 422. Both plots 421 and 422 are shown over time (in seconds) along the x-axis.

In this example, although the traversal of a motion trajectory is complete (indicated by the rhombus symbol) at around 0.6 s, the robot is determined to be in a settled state at about 3.8 s, that is, after more than 3 seconds has elapsed since its completion of the traversal of the motion trajectory. In the example of FIG. 4C, lower confidence scores represent a higher level of confidence that the robot has entered a settled state. Thus, as depicted in plot 422, the confidence score decreases from 1.0 at 0.6 s to 0.2 at 3.6 s.

The relatively longer waiting period, e.g., compared to the example of FIG. 4A, is due to the noise in the current velocity value for the joint of the robot. As depicted in plot 421, the current velocity value trembles around zero throughout the entire time period depicted in plot 421. Correspondingly, it takes longer to determine whether the robot has entered the settled state.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it, software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:

executing, by a robot having one or more joints, a motion trajectory to move from a first pose to a second pose;

repeatedly computing a settled state confidence score after the robot has begun execution of the motion trajectory, wherein the settled state confidence score represents a level of confidence that the robot has entered a settled state, and wherein computing the confidence score comprises, at each of multiple time points:

determining, for each of the one or more joints of the robot, a current velocity value based on status data reported by the robot; and determining, for each of the one or more joints of the robot, a velocity difference between (i) the current velocity value determined from the status data reported by the robot and (ii) a target velocity value specified by the motion trajectory; and computing, based at least on the current velocity values, and the velocity differences, a current settled state confidence score for the time point; and whenever the current settled state confidence score satisfies a threshold value, executing, by the robot, a command that causes the robot to move.

Embodiment 2 is the method of embodiment 1, wherein the settled state is a state of the robot in which a velocity value of a joint of the robot is within an error band around a predetermined velocity value.

Embodiment 3 is the method of embodiment 2, wherein the predetermined velocity value is zero.

Embodiment 4 is the method of any one of embodiments 1-3, wherein computing the confidence score comprises:

obtaining an indicator value that indicates whether the execution of the motion trajectory by the robot is complete; and computing, based on the current velocity values, the velocity differences, and the indicator value, the current settled state confidence score for the time point.

Embodiment 5 is the method of any one of embodiments 1-4, wherein computing the current settled state confidence score comprises:

computing a variance of the velocity differences over multiple time points up to the current time point.

Embodiment 6 is the method of embodiment 5, wherein computing the current settled state confidence score comprises:

determining an update to a previous settled state confidence score based on the variance of the velocity differences and the current velocity values.

Embodiment 7 is the method of embodiment 4, wherein the indicator value is a Boolean value.

Embodiment 8 is the method of any one of embodiments 1-7, wherein the multiple time points are separated from each other by a fixed time interval that is dependent on an operating frequency of the robot.

Embodiment 9 is the method of any one of embodiments 1-8, wherein executing, by the robot, the command that causes the robot to move comprises:

performing an action by an end effector of the robot in accordance with the command.

Embodiment 10 is the method of any one of embodiments 1-9, wherein executing, by the robot, the command that causes the robot to move comprises:

executing another motion trajectory to move from the second pose to a third pose in accordance with the command.

Embodiment 11 is a system comprising: one or more computers and one or more storage devices storing instructions that are operable, when executed by the one or more computers, to cause the one or more computers to perform the method of any one of embodiments 1 to 10.

Embodiment 12 is a computer storage medium encoded with a computer program, the program comprising instructions that are operable, when executed by data processing apparatus, to cause the data processing apparatus to perform the method of any one of embodiments 1 to 10.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain cases, multitasking and parallel processing may be advantageous.

What is claimed is:

1. A method comprising:

executing, by a robot having one or more joints, a motion trajectory to move from a first pose to a second pose;

repeatedly computing a settled state confidence score after the robot has begun execution of the motion trajectory, wherein the settled state confidence score represents a level of confidence that the robot has entered a settled state, and wherein computing the confidence score comprises, at each of multiple time points:

determining, for each of the one or more joints of the robot, a current velocity value based on status data reported by the robot; and determining, for each of the one or more joints of the robot, a velocity difference between (i) the current velocity value determined from the status data reported by the robot and (ii) a target velocity value specified by the motion trajectory; and computing, based at least on the current velocity values, and the velocity differences, a current settled state confidence score for the time point; and whenever the current settled state confidence score satisfies a threshold value, executing, by the robot, a command that causes the robot to move.

2. The method of claim 1, wherein the settled state is a state of the robot in which a velocity value of a joint of the robot is within an error band around a predetermined velocity value.

3. The method of claim 2, wherein the predetermined velocity value is zero.

4. The method of claim 1, wherein computing the confidence score comprises:

obtaining an indicator value that indicates whether the execution of the motion trajectory by the robot is complete; and computing, based on the current velocity values, the velocity differences, and the indicator value, the current settled state confidence score for the time point.

5. The method of claim 1, wherein computing the current settled state confidence score comprises:

computing a variance of the velocity differences over multiple time points up to the current time point.

6. The method of claim 5, wherein computing the current settled state confidence score comprises:

determining an update to a previous settled state confidence score based on the variance of the velocity differences and the current velocity values.

7. The method of claim 4, wherein the indicator value is a Boolean value.

8. The method of claim 1, wherein the multiple time points are separated from each other by a fixed time interval that is dependent on an operating frequency of the robot.

9. The method of claim 1, wherein executing, by the robot, the command that causes the robot to move comprises:

performing an action by an end effector of the robot in accordance with the command.

10. The method of claim 1, wherein executing, by the robot, the command that causes the robot to move comprises:

executing another motion trajectory to move from the second pose to a third pose in accordance with the command.

11. A system comprising one or more computers and one or more non-transitory storage devices storing instructions that are operable, when executed by the one or more computers, to cause the one or more computers to perform operations comprising:

executing, by a robot having one or more joints, a motion trajectory to move from a first pose to a second pose;

repeatedly computing a settled state confidence score after the robot has begun execution of the motion trajectory, wherein the settled state confidence score represents a level of confidence that the robot has entered a settled state, and wherein computing the confidence score comprises, at each of multiple time points:

determining, for each of the one or more joints of the robot, a current velocity value based on status data reported by the robot; and determining, for each of the one or more joints of the robot, a velocity difference between (i) the current velocity value determined from the status data reported by the robot and (ii) a target velocity value specified by the motion trajectory; and computing, based at least on the current velocity values, and the velocity differences, a current settled state confidence score for the time point; and whenever the current settled state confidence score satisfies a threshold value, executing, by the robot, a command that causes the robot to move.

12. The system of claim 11, wherein the settled state is a state of the robot in which a velocity value of a joint of the robot is within an error band around a predetermined velocity value.

13. The system of claim 12, wherein the predetermined velocity value is zero.

14. The system of claim 11, wherein computing the confidence score comprises:

obtaining an indicator value that indicates whether the execution of the motion trajectory by the robot is complete; and computing, based on the current velocity values, the velocity differences, and the indicator value, the current settled state confidence score for the time point.

15. The system of claim 11, wherein computing the current settled state confidence score comprises:

computing a variance of the velocity differences over multiple time points up to the current time point.

16. The system of claim 15, wherein computing the current settled state confidence score comprises:

determining an update to a previous settled state confidence score based on the variance of the velocity differences and the current velocity values.

17. The system of claim 14, wherein the indicator value is a Boolean value.

18. The system of claim 11, wherein the multiple time points are separated from each other by a fixed time interval that is dependent on an operating frequency of the robot.

19. The system of claim 11, wherein executing, by the robot, the command that causes the robot to move comprises one of:

performing an action by an end effector of the robot in accordance with the command, or executing another motion trajectory to move from the second pose to a third pose in accordance with the command.

20. A non-transitory computer storage medium encoded with instructions that, when executed by one or more computers, cause the one or more computers to perform operations comprising:

executing, by a robot having one or more joints, a motion trajectory to move from a first pose to a second pose;

repeatedly computing a settled state confidence score after the robot has begun execution of the motion trajectory, wherein the settled state confidence score represents a level of confidence that the robot has entered a settled state, and wherein computing the confidence score comprises, at each of multiple time points:

determining, for each of the one or more joints of the robot, a current velocity value based on status data reported by the robot; and determining, for each of the one or more joints of the robot, a velocity difference between (i) the current velocity value determined from the status data reported by the robot and (ii) a target velocity value specified by the motion trajectory; and computing, based at least on the current velocity values, and the velocity differences, a current settled state confidence score for the time point; and whenever the current settled state confidence score satisfies a threshold value, executing, by the robot, a command that causes the robot to move.

* * * * *